United States Patent
Johnson et al.

(10) Patent No.: US 7,806,450 B2
(45) Date of Patent: Oct. 5, 2010

(54) VEHICLE COMPONENT AND METHOD FOR MAKING A VEHICLE COMPONENT

(75) Inventors: Jack L. Johnson, Holland, MI (US); Daniel F. White, Holland, MI (US)

(73) Assignee: Johnson Controls Technology Company, Holland, MI (US)

( * ) Notice: Subject to any disclaimer, the term of this patent is extended or adjusted under 35 U.S.C. 154(b) by 657 days.

(21) Appl. No.: 10/575,436

(22) PCT Filed: May 26, 2004

(86) PCT No.: PCT/US2004/016467

§ 371 (c)(1), (2), (4) Date: Apr. 11, 2006

(87) PCT Pub. No.: WO2005/039857

PCT Pub. Date: May 6, 2005

(65) Prior Publication Data

US 2007/0029829 A1 Feb. 8, 2007

Related U.S. Application Data

(60) Provisional application No. 60/511,988, filed on Oct. 16, 2003.

(51) Int. Cl.
*B60R 13/02* (2006.01)
(52) U.S. Cl. .................................................. 296/1.08
(58) Field of Classification Search ............... 296/1.08, 296/1.09, 146.7, 153; 428/31, 121, 192; 264/41, 45.1, 45.5, 46.4; 52/716.5
See application file for complete search history.

(56) References Cited

U.S. PATENT DOCUMENTS

| 3,933,562 | A | | 1/1976 | Cruckshank et al. |
|-----------|---|---|--------|-------------------|
| 4,501,541 | A | | 2/1985 | Bethell et al. |
| 4,779,390 | A | * | 10/1988 | Repper et al. .................. 52/222 |
| 4,992,224 | A | | 2/1991 | Swenson et al. |
| 5,000,168 | A | * | 3/1991 | Lipson ......................... 602/20 |
| 5,071,605 | A | * | 12/1991 | Kawaguchi et al. ......... 264/45.2 |
| 5,176,860 | A | | 1/1993 | Storch |
| 5,234,639 | A | * | 8/1993 | Smith ......................... 264/46.5 |

(Continued)

FOREIGN PATENT DOCUMENTS

JP     2000006283     1/2000

OTHER PUBLICATIONS

International Search Report for PCT/US2004/016467, date of mailing Feb. 21, 2005, 3 pages.

(Continued)

*Primary Examiner*—H Gutman
(74) *Attorney, Agent, or Firm*—Foley and Lardner LLP (57) ABSTRACT

A method for forming a component (210) for a vehicle includes providing a substrate (230) that includes a relatively rigid material and providing a skin (222) adjacent at least a portion of the substrate such that a cavity is formed between the substrate and the skin. The method also includes coupling at least a portion of the skin to the substrate and introducing a material (240) into the cavity after securing at least a portion of the skin to the substrate. The skin and the material introduced into the cavity form a cushioned region for the vehicle component.

20 Claims, 6 Drawing Sheets

U.S. PATENT DOCUMENTS

| | | | |
|---|---|---|---|
| 5,478,107 A * | 12/1995 | Yamagishi et al. | 280/728.3 |
| 5,500,169 A * | 3/1996 | Kondo et al. | 264/46.5 |
| 5,618,477 A * | 4/1997 | Suzuki | 264/46.5 |
| 5,643,612 A * | 7/1997 | Suzuki | 425/125 |
| 5,709,828 A * | 1/1998 | Bemis et al. | 264/46.5 |
| 5,882,073 A | 3/1999 | Burchi et al. | |
| 5,895,613 A | 4/1999 | Nakai et al. | |
| 5,922,431 A * | 7/1999 | Funato et al. | 428/71 |
| 5,941,590 A * | 8/1999 | Reynolds et al. | 296/39.1 |
| 5,945,200 A * | 8/1999 | Suzuki | 264/46.5 |
| 6,544,449 B1 * | 4/2003 | Gardner | 264/46.5 |
| 6,991,841 B2 * | 1/2006 | Cowelchuk et al. | 428/71 |
| 7,104,590 B2 * | 9/2006 | Dooley et al. | 296/153 |
| 7,147,809 B2 * | 12/2006 | Cowelchuk et al. | 264/46.5 |
| 7,332,207 B2 * | 2/2008 | Bondar et al. | 428/71 |
| 7,444,700 B2 * | 11/2008 | Koutsky et al. | 5/653 |
| 7,534,483 B2 * | 5/2009 | Nelias | 428/172 |
| 7,644,969 B2 * | 1/2010 | Foster et al. | 296/1.08 |
| 2002/0125734 A1 | 9/2002 | Pokorzynski et al. | |
| 2004/0130051 A1 * | 7/2004 | Cowelchok et al. | 264/46.4 |
| 2004/0166302 A1 * | 8/2004 | Lee et al. | 428/304.4 |

OTHER PUBLICATIONS

Europeal Office Action for Application No. 04 753 313.8-1253, received Aug. 17, 2009, 3 pages.

* cited by examiner

VEHICLE COMPONENT AND METHOD FOR MAKING A VEHICLE COMPONENT

CROSS-REFERENCE TO RELATED APPLICATIONS

The present invention claims priority as a national stage application of International Patent Application Serial No. PCT/US2004/016467 filed on May 24, 2004; which claimed priority to U.S. Provisional Application No. 60/511,988 filed on Oct. 16, 2003, which are both hereby incorporated herein by reference in their entirety.

BACKGROUND

The present invention relates generally to the field of components such as panels or other structures for use in vehicles (e.g., automobiles such as cars, trucks, and the like; airplanes, boats, etc.) and methods of making such components. More specifically, the present invention relates to interior panels or structures for vehicles or other applications that include at least one relatively soft (e.g., padded or cushioned) portion.

Padded or cushioned vehicle interior components such as panels (e.g., instrument panels, door panels, etc.) conventionally include a substrate made of a relatively rigid material, a relatively soft core (e.g., a foam core), and an outer surface or skin. For example, a vehicle door panel may be cushioned to provide added comfort for an occupant of a vehicle when a portion of the occupant's body interfaces or contacts the door panel. Various methods of providing such cushioning are known in the art, although such known methods do not provide certain advantageous features and/or combination of features.

For example, one difficulty in producing panels having cushioned portions is that it may be difficult to optimize the location of the cushioned portions such that the cushioned portions are provided only in areas that are directly interfaced (e.g., contacted) by an individual. For example, certain areas of vehicle interior trim panels are not contacted by passengers such as locations on a door panel proximate the floor of the vehicle. There may be little or no reason to provide cushioned portions of the door panel in such regions. Further, providing cushioned portions or regions in areas where there is no requirement to do so adds unnecessary expense (i.e., material, labor, and equipment) and may also add excess weight to the vehicle.

To provide localized cushioned portions for interior vehicle components, one known method involves coupling a cushioned component to a rigid component. For example, a relatively rigid panel (e.g., a door panel) may have coupled thereto a component that includes a relatively rigid substrate, a relatively soft skin, and a foam interior portion. One difficulty with such a method is that such method requires the use of additional components (e.g., an additional substrate, bolts or other fastening devices to secure the panel substrate to the substrate of the cushioned portion, etc.), which adds both weight and expense to the finished product.

Accordingly, there is a need to provide a method for producing components such as panels or other structures for use in vehicles that includes a relatively soft or padded portion or section. There is also a need to provide components that have regions of localized cushioning that are optimized based on the location likely to be interfaced by a vehicle occupant or other individual. There is also a need to provide a component that has regions of localized cushioning that has a decreased mass and requires less material than conventional components having cushioned regions. There is also a need to provide an integrally formed vehicle component that includes localized regions of cushioning. There is also a need to provide components and a method for making components that may be manufactured in a relatively simple and efficient manner with reduced manufacturing and material costs. There is also a need to provide a manufacturing method for producing components having one or more cushioned portions that utilizes existing equipment.

DETAILED DESCRIPTION OF EXEMPLARY EMBODIMENTS

Figure 1:
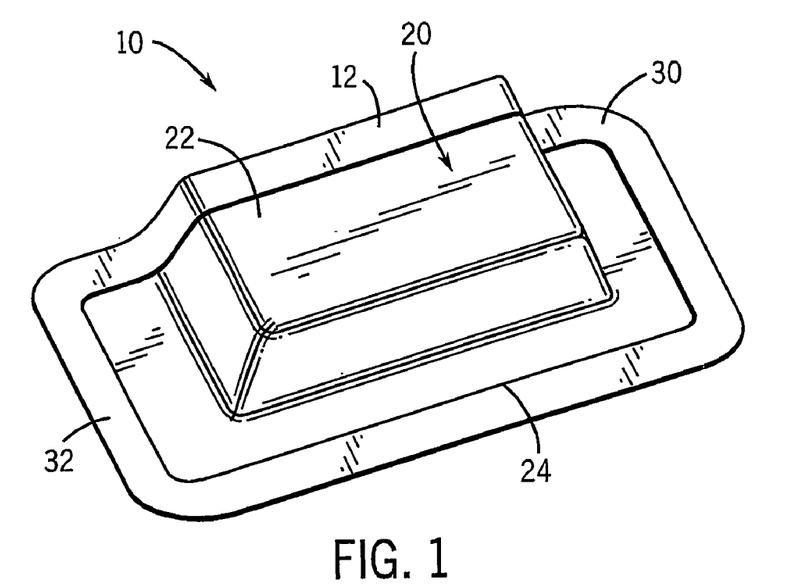
FIG. 1 is a perspective view of a component or assembly for use in a vehicle according to an exemplary embodiment.
Figure 2:
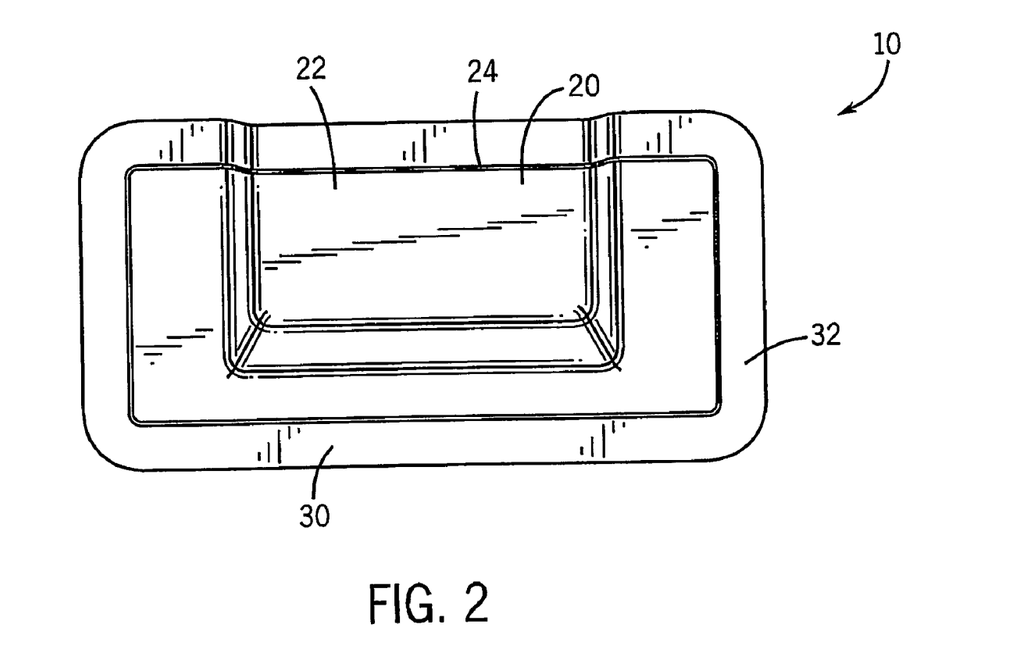
FIG. 2 is a top plan view of the component shown in FIG. 1.
Figure 11:
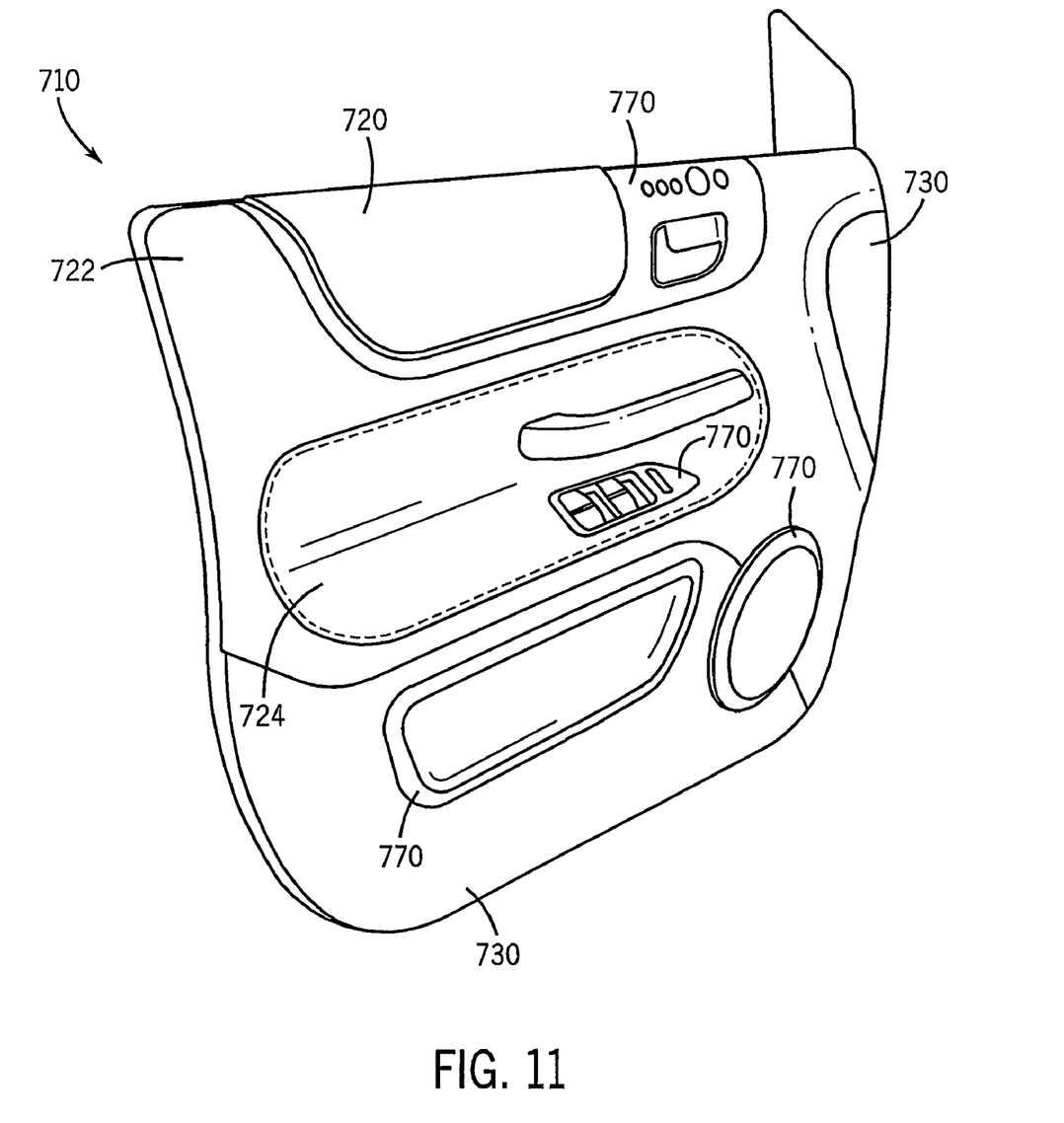
FIG. 11 is a perspective view of a door panel having areas of cushioning according to an exemplary embodiment.

FIGS. 1 and 2 illustrate one exemplary embodiment of a component or assembly 10 such as a panel or other structure for use in a vehicle (e.g., automobiles such as cars, trucks, buses, and the like; airplanes, boats, etc.). Such components may be provided in a wide variety of sizes, shapes, and configurations according to various exemplary embodiments. For example, such components may be utilized in an interior passenger compartment of a vehicle, and may find utility in the form of door panels, dashboards, instrument panels, consoles, sidewall trim, overhead liners, or other vehicle components or portions thereof. FIG. 11 shows one exemplary embodiment of a door panel 710.

Component 10 is provided with one or more localized or discrete areas of softness or cushioning in areas that are interfaced by a passenger or other individual. For example, a door panel such as door panel 710 shown in FIG. 11 may be provided with cushioning in areas where a portion of a passenger's body are likely to contact the door (e.g., on the armrest, adjacent the window sill, etc.) without the need to provide cushioning in the entire door (e.g., see FIG. 11 in which regions of hard plastic 730 are shown in areas not typically contacted by a passenger). In this manner, the regions of cushioning may be optimized based on the typical passenger experience. One advantageous feature of such method is that materials and manufacturing costs may be reduced, and the relatively inefficient practice of providing cushioning in areas that are not generally contacted by a passenger (e.g., beneath the armrest, etc.) may be eliminated.

The methods of providing localized regions of softness or cushioning in a manner described herein may be utilized to provide components having a wide variety of configurations. For example, a door panel may be provided that includes one or more islands of hard plastic (e.g., bezels, accents, appliques, pull cups, etc.). In another example, complex geometries (e.g., ball armrests, x,y,z boundaries, etc.) may be formed. In yet another example, the door panel may include proud (e.g., raised) or recessed regions of cushioning for enhanced aesthetics.

According to an exemplary embodiment, component 10 includes a member or element in the form of a relatively rigid substrate, base, or stratum 30 (referred to herein as a "substrate" for simplicity). A cushioned or padded member or element 20 is provided adjacent or proximate to at least a portion of substrate 30, and includes a cover or skin 22 and a filler material (see, e.g., filler material 240 shown in FIG. 4 with respect to component 210) provided intermediate or between skin 22 and substrate 30. It should be noted that according to various exemplary embodiments, all or a part of the substrate may have a cushioned or padded portion provided adjacent thereto. For example, according to an exemplary embodiment, a skin is applied adjacent a substrate, and portions of the skin may be in direct contact with the substrate, while other portions of the skin may be separated from the substrate by a filler material. In this manner, localized regions of cushioning may be provided while retaining the look and feel of the skin even in those regions not provided with cushioning.

Figure 3:
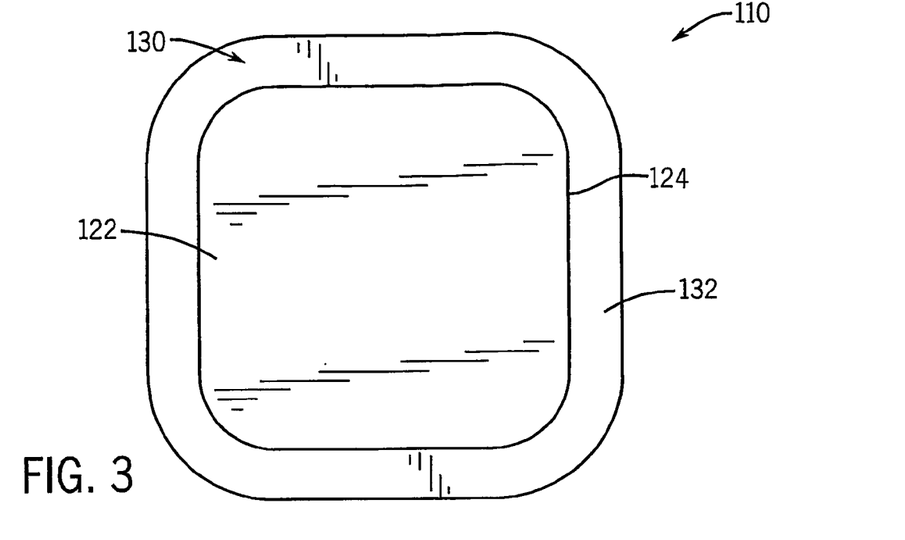
FIG. 3 is a top plan view showing a component for use in a vehicle according to another exemplary embodiment.

Substrate 30 may be made of any suitable material, including any of a variety of metals (e.g., aluminum, magnesium, metal alloys, etc.) or polymers (e.g., polypropylene, polyethylene, copolymers, etc.). Substrate 30 may be formed in any of a wide variety of shapes, sizes, and configurations (see, e.g., the embodiment shown in FIG. 3, in which the substrate has a relatively square shape with rounded corners, and the embodiment shown in FIG. 11, which shows a door panel having regions of localized cushioning), and may include a variety of other features not shown in FIGS. 1 and 2 (e.g., apertures for door locks and handles, molded-in designs, etc.). Substrate 30 may be a stand-alone component or may be a component in a larger assembly (e.g., the substrate may be an entire door panel or may be a portion thereof, etc.).

According to an exemplary embodiment, cushioned member 20 is provided above or over at least a portion of substrate 30. Skin 22 forms at least a portion of an exterior surface 12 (e.g., the portion visible from a passenger compartment, which is typically be referred to as the "A" surface, etc.) of component 10. According to an exemplary embodiment, a portion of substrate 30 forms a portion of exterior surface 12. A boundary 24 between substrate 30 and the skin 22 may be provided (e.g., in the form of an interface, seam, or joint). Boundary 24 may be visible at exterior surface 12 or may be filled in with a material to provide a "seamless" look for component 10.

According to an exemplary embodiment, skin 22 is made of a relatively soft or flexible material comprising a polymeric material (e.g., polyurethane, polyvinylchloride (PVC), a thermoplastic olefin (TPO), etc.). According to other exemplary embodiments, the skin may be made of other materials, including textiles such as cloth, leather, composite materials, layered materials (e.g., a layer of leather applied above a polymeric material layer), etc.

According to a preferred embodiment, skin 22 is provided on substrate 30 in such a manner that a space or void (e.g., a cavity or gap) (see, e.g., space 216 shown in FIG. 4) is formed intermediate or between at least a portion of skin 22 and substrate 30. According to one exemplary embodiment, substantially all of skin 22 away from boundary 24 between substrate 30 and skin 22 is separated from substrate 30 by a space or void (e.g., to form a cavity). According to another exemplary embodiment, portions of the skin may be provided in direct contact with the substrate, such that one or more spaces or voids are provided between the skin and the substrate in one or more particular regions. The particular design chosen may depend on any of a variety of factors, including the desired look and feel of the outer surface of the panel, materials costs, ease of manufacturing, etc.

Figures 4, 5:
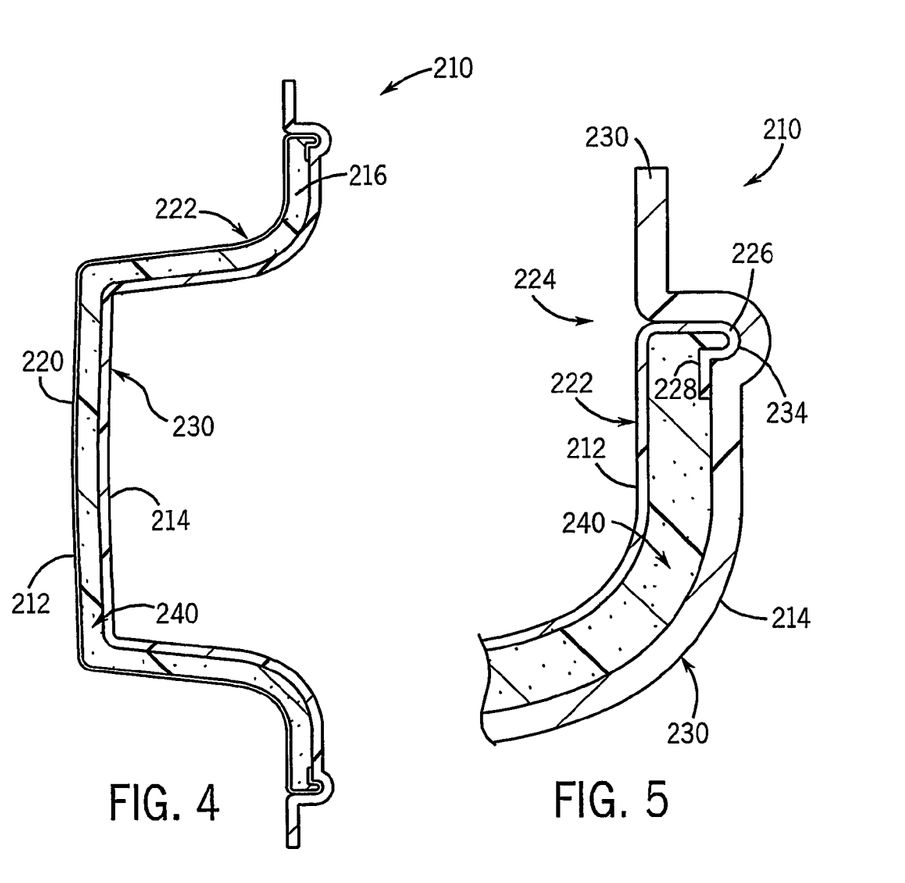
FIG. 4 is a side cutaway view of a component according to another exemplary embodiment.
FIG. 5 is a side cutaway view of a portion of the component shown in FIG. 4.

A material (e.g., a filler material) such as material 240 shown in FIG. 4 is provided or introduced into the cavity between substrate 30 and skin 22 to act as a filler. It is intended that such material acts as a relatively soft or cushioning material to provide cushioned member 20 with at least a portion of its relatively soft or cushioned characteristic. According to an exemplary embodiment, the filler material is a polymeric material such as a foam material (e.g., a urethane foam). The filler material is provided into the cavity in liquid form and is subsequently expanded to fill the cavity. For example, where a foam material is provided as a filler material, the foam reacts to expand and form a cellular structure within the cavity.

According to an exemplary embodiment, skin 22 is manufactured or produced utilizing a slush molding process. In a slush molding process, a thermoplastic material in a liquid or powdered form is introduced into a temperature-controlled mold to form a viscous skin adjacent to the mold walls. Once the skin is formed, the excess material is removed from the mold and the skin is allowed to cure and cool, after which the skin is removed from the mold. One advantage of utilizing a slush molding process is that it is relatively inexpensive and efficient in producing relatively complex skin geometries.

According to another exemplary embodiment, skin 22 is manufactured or produced utilizing a vacuum forming process. In a vacuum molding process, a pre-cut or formed sheet of polymeric material is provided in a mold and heated to soften the material. A vacuum is applied to the mold, which draws the softened polymeric material toward the walls of the mold. The polymeric material then cools and maintains the shape defined by the mold walls.

According to other exemplary embodiments, skin 22 may be manufactured according to various other methods. For example, skin 22 may be formed in an injection molding process, an extrusion process, a casting process (e.g., gravity casting), or any other suitable process for forming a polymeric skin.

According to an exemplary embodiment in which skin 22 is made of a polymeric material, skin 22 has a thickness of between approximately 0.5 and 3.0 millimeters, and most preferably between approximately 1.0 and 1.5 millimeters.

Skin 22 may have a size, shape, and configuration that is adapted or configured to features included in the substrate. According to one exemplary embodiment (shown, e.g., in FIG. 3), a substrate 130 may include a cutout or depression, and a skin 122 may be provided within the cutout. According to another exemplary embodiment (shown, e.g., in FIGS. 4-5), a substrate 230 may be provided such that it protrudes outward, and a skin 222 may be applied over the substrate 230. The size, shape, and configuration of the skin and substrate may have any number of forms, and relatively complex geometries may be formed. For example, the skin may be provided over a substrate in the form of a door panel such that the skin wraps around an edge (e.g., a rear edge) of the panel. One of skill in the art will appreciate that various possibilities exist in this regard.

As shown in FIG. 1 boundary 24 (e.g., a seam or joint) is formed or provided between skin 22 and the substrate 30, such that substrate 30 forms a frame 32 around skin 22. The size, shape, and configuration of boundary 24 may vary in various exemplary embodiments. Boundary 24 may also be eliminated or reduced in size using a material to at least partially fill in boundary 24 (e.g., a caulk, adhesive, liquid polymer, or other materials). According to other embodiments, the skin may be provided in such a manner that no visual boundary exists (e.g., the skin is provided over all portions of the substrate such that no boundary is visible on the exterior surface of the component).

Skin 22 and/or substrate 30 may include features configured to couple at least a portion of skin to the substrate 30. The coupling may be accomplished by way of a mechanical interconnection (e.g., a friction or interference fit) or by other mechanisms. According to an exemplary embodiment, the skin is coupled to the substrate in a maimer that provides a relatively airtight and/or watertight seal between the skin and the substrate.

Figure 9A:
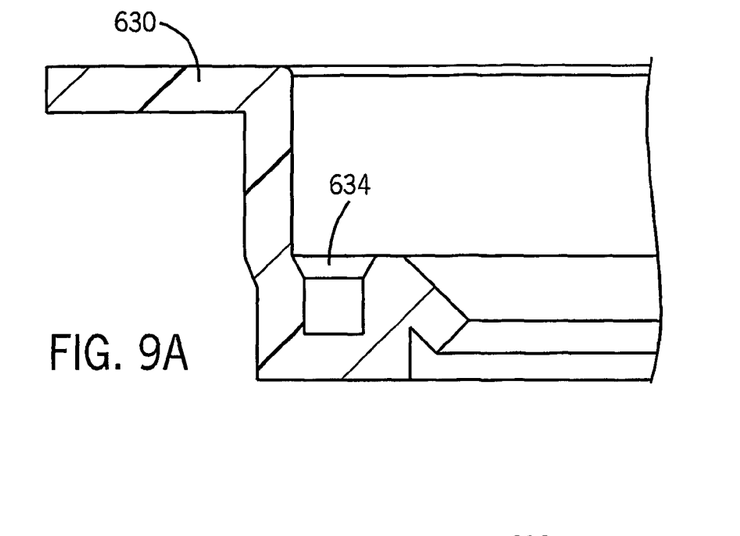
FIGS. 9A-9B show side cutaway views of a skin and a substrate for a component according to another exemplary embodiment.
Figure 9B:
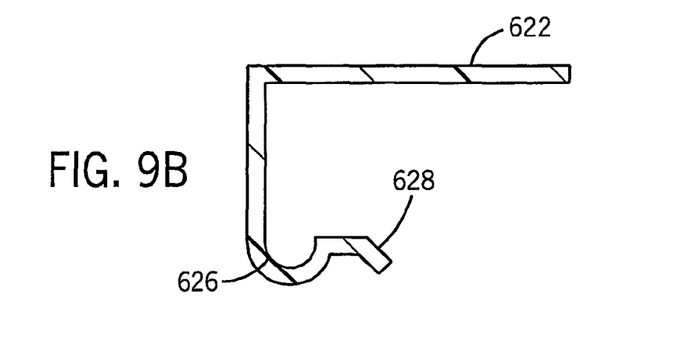
Figure 10:
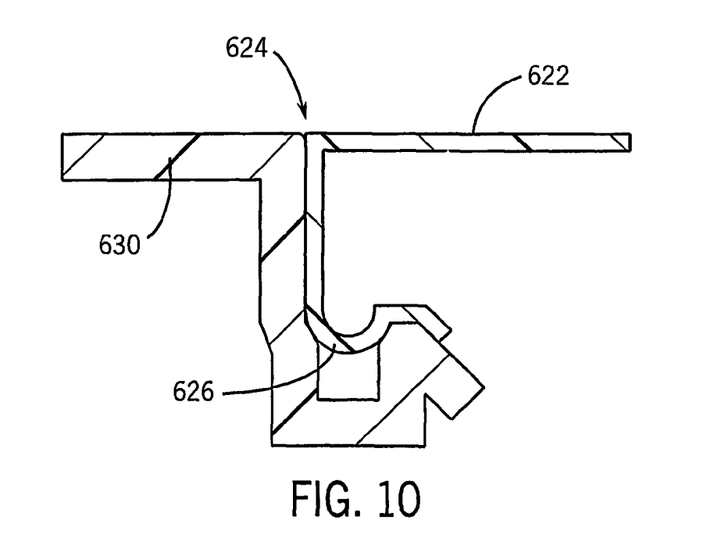
FIG. 10 is a side cutaway view showing the coupling of the skin and substrate shown in FIG. 9.

FIGS. 4 and 5 illustrate one exemplary embodiment showing the coupling between skin 222 and substrate 230 (FIG. 5 shows an enlarged portion of FIG. 4 showing the point of coupling in greater detail). A protrusion or extension 226 (shown, for example, as a generally U-shaped portion of the skin) extends from the skin into an opening or channel 234 (e.g., a groove, recess, notch, etc.) provided or formed in substrate 230. The size, shape, and configuration of protrusion 226 and channel 234 may be provided such that protrusion 226 and channel 234 mate when they are brought together (e.g., the protrusion may include a relatively rounded or curved portion that has a radius similar to a radius provided for a relatively rounded or curved portion of the channel or opening, as shown in FIGS. 9-10, which show a substrate 630 having a channel 634 provided therein and a skin 622 having a rounded protrusion 626 and a flange or extension 628; as shown in FIG. 10, skin 622 is coupled to substrate 630 and a boundary 624 is formed therebetween, and protrusion 626 is received within aperture 634). Protrusion 226 may include a flange or extension 228 that extends therefrom to provide enhanced fitment between skin 222 and substrate 230.

Any of a variety of configurations may be utilized for the protrusion and channel, several nonexclusive examples of which are shown in the accompanying FIGURES. The protrusion may be formed on the skin by forming a portion of the skin in the mold (e.g., to provide an edge of the skin with a "folded back" configuration to form a protrusion) or by forming the protrusion after the skin is removed from the mold. The protrusion may be integral to the skin or may be produced separately and secured thereto by an adhesive or other fastener. The position of the protrusion and the channel may be reversed, such that a channel is formed in at least a portion of the skin and one or more protrusions are formed in the substrate, such that the protrusion(s) of the substrate may be inserted into the channel(s) formed in the skin to produce a mechanical seal between the skin and substrate.

One or both of protrusion 226 and the walls or surfaces of channel 234 may be relatively flexible and/or resilient such that insertion of protrusion 226 into channel 234 causes one or both of protrusion 226 and the walls or surface of 234 to bend or flex. Upon insertion of protrusion 226 into channel 234, the flexible and/or resilient component may return to its preinsertion state to couple skin 222 to substrate 230.

According to an exemplary embodiment, skin 222 and substrate 230 are coupled together such that a relatively airtight and/or watertight seal is provided. In one example, skin 222 includes a protrusion that extends substantially entirely about the periphery of skin 222 and substrate 230 includes a channel 234 that extends substantially entirely about the periphery of the area over which skin 222 is provided. Protrusion 226 is pressed or positioned into channel 234 to form a seal about substantially the entire periphery of skin 222 to form a seal. According to an exemplary embodiment, one or both of protrusion 226 and channel 234 may extend only partially about their periphery to provide local sealing of skin 222 to substrate 230 (e.g., the skin may include a plurality of protrusions that are provided intermittently about the periphery of the skin). Various sizes, shapes, and configurations may be used for the protrusion and the channel to couple the skin to the substrate.

According to another exemplary embodiment, the skin includes one or more features (e.g., protrusions) that are drawn into an opening such as a groove, channel, or other structure provided in the substrate by way of a vacuum or other pressure or force. For example, the skin may include one or more protrusions that extend at least a portion of the way about the periphery of the skin, and the protrusions may be inserted into an opening provided in the substrate. In such an embodiment, the skin is held in place by application of a vacuum that removes the air between the protrusions and the walls of the opening. In this manner, a relatively airtight and/or watertight seal may be formed between the skin and the substrate.

Figure 6:
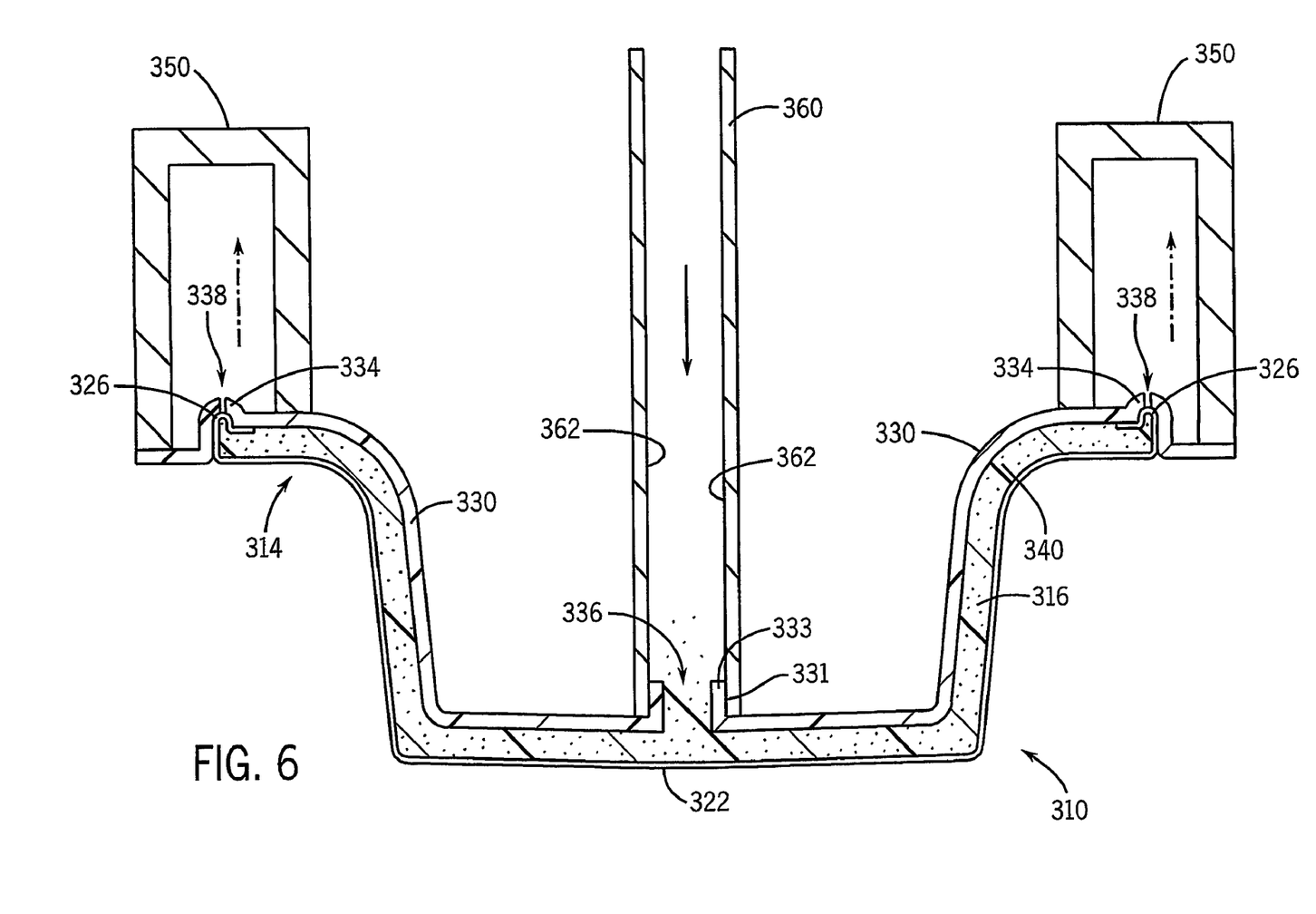
FIG. 6 is a side cutaway view of a component similar to that shown in FIG. 4 illustrating a component formation operation.

FIG. 6 shows one exemplary embodiment of a component 310 in which an aperture 336 is formed or provided in a substrate 330; a vacuum may be drawn through one or more apertures 338 formed in a channel 334 formed in substrate 330 to secure a skin to substrate 330. A vacuum box 350 may be used to draw the vacuum, and may have a size sufficient to allow for overflow of filler material 340 into vacuum box 350 during manufacturing.

Figure 7:
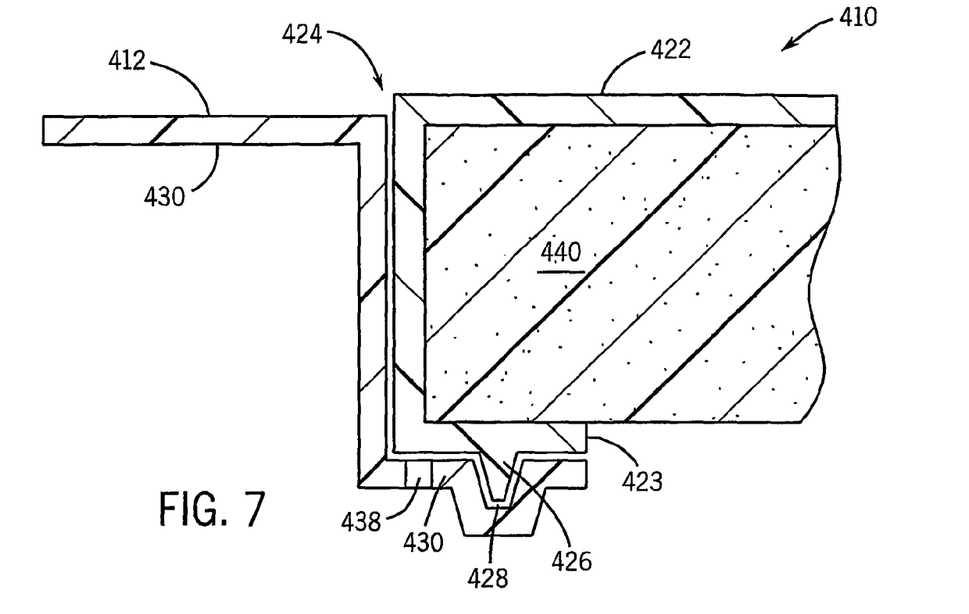
FIG. 7 is a side cutaway view of a portion of a component according to another exemplary embodiment.

In contrast to the embodiment shown in FIG. 6, one or more apertures provided in the substrate for allowing the use of a vacuum may be provided in other locations in the substrate (i.e., instead of directly proximate or adjacent to a protrusion provided on the skin). For example, FIG. 7 illustrates an exemplary embodiment of a component 410 having a skin 422 and a substrate 430 with a boundary 424 provided therebetween in which an aperture 438 is provided adjacent or proximate to boundary 424 between skin 422 and substrate 430. In such an embodiment, a locator or push button 423 is provided to provide a place for an individual to press a protrusion 426 into a channel 428. A filler material 440 is provided between skin 422 and substrate 430.

Figure 8:
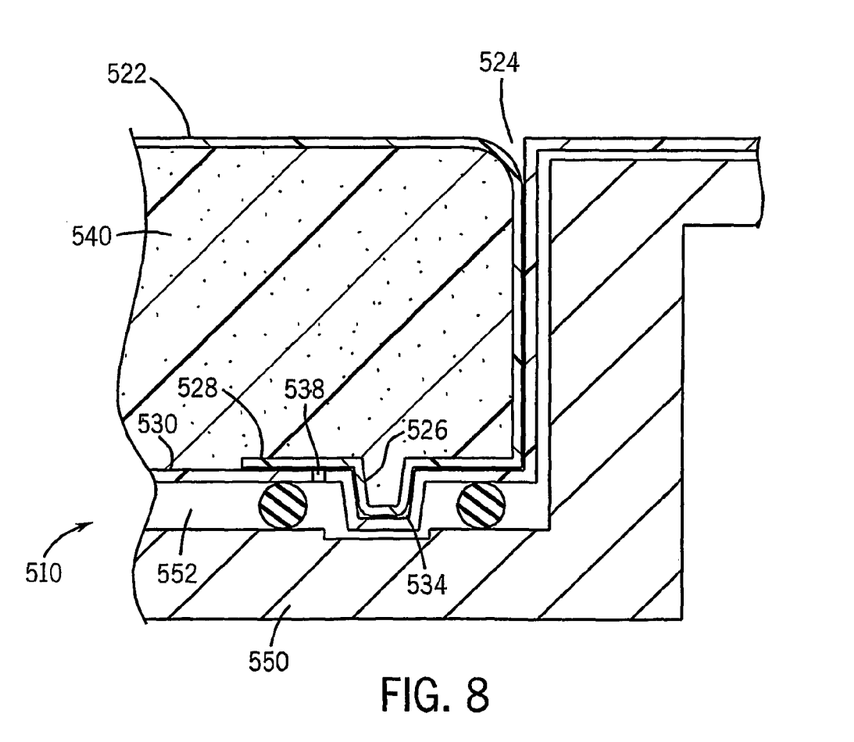
FIG. 8 is a side cutaway view of a component according to another exemplary embodiment illustrating a component formation operation.

According to another exemplary embodiment of a component 510 shown in FIG. 8, a protrusion 526 of a skin 522 is provided in a channel 534 of a substrate 530, and an aperture 538 is formed in sustrate 530 underlying a flange 528 provided in skin 522. That is, aperture 538 is provided such that it is on the side of protrusion 526 opposite a boundary 524 formed between skin 522 and substrate 530. A vacuum box 550 forms a vacuum chamber 552 adjacent aperture 538, and a filler material 540 is provided between skin 522 and substrate 530.

According to yet another exemplary embodiment, both mechanical fastening features (e.g., interference fit protrusion(s) and channel(s)) and vacuum coupling features may be provided. According to such an embodiment, the skin includes one or more protrusions that fit into one or more openings to mechanically secure the skin to the substrate, and the substrate also includes one or more apertures to allow suction by a vacuum to secure the skin to the substrate. In any of the exemplary embodiments illustrated in FIGS. 6-8 (or in other exemplary embodiments), the protrusion may provide a mechanical coupling in addition to the seal provided by the use of a vacuum or may act only as a guide to provide proper location of the skin onto the substrate.

FIG. 6 illustrates an exemplary embodiment of a mechanism for introducing material into the space or cavity 316 formed between skin 322 and substrate 330. According to this embodiment, two apertures 338 are provided in substrate 330 for allowing vacuum suction. A vacuum is created to secure skin 322 to substrate 330 (e.g., by utilizing vacuum boxes 350 to draw the vacuum and secure skin 322 to substrate 330 in the areas of apertures 338). Mechanical coupling between protrusions 326 and channels 334 may also be utilized to secure skin 322 to substrate 330.

Once skin 322 is secured to substrate 330 by vacuum and/or mechanical means, foam or other filler material 340 is introduced into cavity 316 through a fill tube or nozzle 360 (e.g., by injection or gravity pouring). Fill tube 360 is coupled to an opening or aperture 336 formed in a portion of substrate 330 to allow introduction of the filler material 340 into cavity 316. Because skin 322 is coupled to substrate 330 in a relatively airtight and/or watertight manner (e.g., by way of the vacuum and/or mechanical coupling mechanisms), filler material 340 does not escape into vacuum box 350 through apertures 338. While the embodiment shown in FIG. 6 illustrates a fill tube 360 that has an interior surface 362 that engages an exterior surface 331 of walls 333 of aperture 336 provided in substrate 330, such an arrangement may be reversed such that a portion of fill tube 360 is inserted into an opening or aperture in substrate 330. Various other configurations for the engagement between substrate 330 and fill tube 360 may also be utilized according to various other exemplary embodiments.

The numbers, size, shape, and configuration of apertures for allowing vacuum suction and for coupling to the fill tube may vary according to other exemplary embodiments. For example, more than one fill tube may be coupled to the substrate in various locations, and more than one aperture may be provided for coupling to such fill tubes. The various features of the apertures may be optimized according to various considerations, including manufacturability, cost, and other considerations.

According to an exemplary embodiment, the skin is coupled to the substrate in a manner that does not require the use of a vacuum (e.g., a mechanical interlock or coupling between a portion of the skin and a portion of the substrate). In such an embodiment, the vacuum boxes (FIG. 6) may be omitted, with the mechanical coupling providing an airtight and/or watertight seal between the skin and the substrate. The mechanical coupling is intended to couple the skin to the substrate in a manner that does not allow foam or other filler material to escape.

According to an exemplary embodiment, a method of producing a component having one or more cushioned regions includes inserting or providing a substrate or a portion thereof in a mold or other tooling such as a foam-in-place (FIP) tool having a clamshell configuration. One preferred tool is a composite/aluminum tool manufactured by EPW, Inc. of Elkhart, Ind. The substrate is provided in the mold such that the "A" side or exterior surface portion faces outward (i.e., the rear portion of the substrate is in contact with the mold walls).

The skin (e.g., a slush molded or vacuum molded polymeric skin) is coupled to the substrate in one or more locations via mechanical and/or vacuum means. For example, the skin may be coupled to the substrate by inserting protrusions formed on the skin into openings such as channels or grooves formed in the substrate to mechanically couple the skin to the substrate. According to various embodiments, a vacuum may be drawn to secure the skin to the substrate in addition to or in place of the mechanical coupling (e.g., utilizing one or more vacuum apertures formed in the substrate).

Once the skin is secured to the substrate, the mold or tooling is closed. Foam or another filler material is introduced in one or more cavities formed between or intermediate the skin and the substrate to provide a relatively soft or cushioning material. One or more fill tubes or other devices are coupled to an aperture formed in the substrate that provides an entry point into the one or more cavities provided between the skin and substrate. One or more vent holes may also be provided in the substrate to reduce the amount of carbon dioxide or other gas accumulating within the component during the filling operation.

The component comprising the skin, substrate, and foam is then removed from the mold or tooling. The skin is coupled to the substrate both by mechanical means (e.g., protrusion and opening coupling) and by the interaction between the filler material and the skin and substrate. For example, a bond may be formed between the skin and foam provided in a cavity. According to an alternative embodiment, an adhesive may be provided on one or both of the substrate and the skin on the interior of the cavity to bond the foam thereto.

Various process steps may also be utilized in addition to or in place of those described above. For example, it may be necessary to seal or close one or more apertures provided in the substrate subsequent to the filling operation (e.g., to prevent foam or filler material from escaping). In another example, the mold may be rotated after inserting the skin and substrate into the mold and closing the mold prior to filling the cavity or cavities with filler material.

The various teachings of the present disclosure may be used to form components having a wide variety of geometries and complexity. FIG. 11 shows one exemplary embodiment of a component 710 in the form of a door panel for a vehicle. Component 710 includes a substrate 730 made of a relatively rigid material such as hard plastic or the like and a number of members or elements that are characterized as regions of localized cushioning or softness (e.g., labeled with reference numerals 720, 722, and 724). Trim material (e.g., plastic, wood, metal, etc.) may also be provided in various locations on component 710.

Members 720, 722 and 724 may be made at the same time or in a sequential manufacturing method, and may be made from the same or different materials (e.g., member 720 may have a different skin and/or filler material than is used for members 722 and 724; for example, the skin color of member 720 may differ for aesthetic reasons and/or member 720 may utilize different materials because member 720 is likely to receive a great deal of driver or passenger contact (e.g., the driver or passenger may rest an elbow or arm on member 720)).

The construction and arrangement of the elements of the vehicle component as shown in the various exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited herein (e.g., the color of the skin may differ from that of the substrate or may be substantially the same color as the substrate). For example, elements shown as integrally formed may be constructed of multiple parts or elements (e.g., protrusions extending from the skin to couple the skin to the substrate may be integrally formed with the skin or produced separately and coupled or adhered to the skin), the position of elements may be reversed or otherwise varied (e.g., protrusions may be provided in the substrate to engage an opening such as a channel or groove formed in the skin), and the nature or number of discrete elements or positions may be altered or varied (e.g., the number of apertures provided in the substrate for receiving a filler material may differ according to any of a number of considerations). It should be noted that the elements and/or assemblies of the system may be constructed from any of a wide variety of materials that provide sufficient strength or durability, including any of a wide variety of moldable plastic materials (such as high-impact plastic) in any of a wide variety of colors, textures and combinations. Components such as those shown herein may be used in non-vehicle applications as well, including but not limited to furniture such as chairs, desks, benches, and other furniture items. Other substitutions, modifications, changes and omissions may be made in the design, operating conditions and arrangement of the preferred and other exemplary embodiments without departing from the scope of the present invention.

What is claimed is:

1. A trim component for a vehicle comprising:
    a substrate having a channel defined by a first wall and an opposite second wall, the second side wall being separated from the first wall by a base wall of the channel;
    a skin having a protrusion and coupled to the substrate by engagement of the protrusion with the channel, the protrusion being in direct engagement with both the first wall and the second wall of the channel;
    a foam material disposed between the skin and the substrate;
    wherein the skin and the foam material form a cushioned region for the vehicle component.

2. The trim component of claim 1, wherein the skin is coupled to the substrate by a friction or interference fit between the projection and the first wall and the second wall of the channel.

3. The trim component of claim 1, wherein the protrusion is formed as a "U"-shaped portion of the skin.

4. The trim component of claim 1, wherein the substrate includes at least one vacuum aperture that extends through the substrate and is used to draw a vacuum through the substrate to couple the skin to the substrate when the foam material is injected into a space between the skin and the cavity.

5. The trim component of claim 4, wherein the vacuum aperture is located in the channel.

6. The trim component of claim 4, wherein the vacuum aperture extending through the substrate is located outside of the channel between the protrusion and a lateral edges of the skin.

7. The trim component of claim 4, wherein the protrusion is located between the vacuum aperture extending through the substrate and the lateral edge of the skin.

8. The trim component of claim 5, wherein the vacuum aperture is located in a base of the channel between the first wall and the second wall of the channel.

9. The trim component of claim 1, wherein the protrusion is formed as a solid portion extending from the skin.

10. The trim component of claim 1, wherein the protrusion is provided at a periphery of the skin.

11. The trim component of claim 1, wherein the direct engagement of the protrusion with both the first wall and the second wall of the channel provides a mechanical seal between the skin and the substrate.

12. The trim component of claim 1, wherein the protrusion is configured to be pressed into the channel.

13. The trim component of claim 1, wherein the protrusion extends substantially about the entire periphery of the skin.

14. The trim component of claim 1, wherein the direct engagement of the protrusion with both the first wall and the second wall of the channel provides at least one of an airtight and watertight seal.

15. The trim component of claim 1, wherein the skin includes a flange that outwardly extends from the protrusion.

16. The trim component of claim 15, wherein the flange engages a surface of the substrate adjacent to the channel.

17. The trim component of claim 1, wherein the protrusion has a shape that substantially corresponds to a shape defined by the first and second walls of the channel.

18. The trim component of claim 17, wherein the protrusion includes a rounded portion having a radius that is substantially the same as a rounded portion of the channel defined by the first and second walls.

19. The trim component of claim 1, wherein at least one of the first and second walls of the channel and the protrusion being flexible such that insertion of the protrusion into the channel causes at least one of the first and second walls of the channel and the protrusion to flex.

20. The trim component of claim 19, wherein upon insertion of the protrusion into the channel, at least one of the first and second walls of the channel and the protrusion returns to a pre-insertion state to couple the skin to the substrate.

* * * * *